US009065674B2

(12) United States Patent
Gruber et al.

(10) Patent No.: US 9,065,674 B2
(45) Date of Patent: Jun. 23, 2015

(54) MULTIPLE SLIMBUS CONTROLLERS FOR SLIMBUS COMPONENTS

(75) Inventors: Hans Georg Gruber, San Diego, CA (US); Julio Arceo, San Diego, CA (US); Magesh Hariharan, San Diego, CA (US); Suren Mohan, San Diego, CA (US); Mark A. Landguth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 13/352,163

(22) Filed: Jan. 17, 2012

(65) Prior Publication Data

US 2013/0019038 A1    Jan. 17, 2013

Related U.S. Application Data

(60) Provisional application No. 61/481,051, filed on Apr. 29, 2011.

(51) Int. Cl.
*G06F 13/42*    (2006.01)
*G06F 13/00*    (2006.01)
*H04L 12/40*    (2006.01)

(52) U.S. Cl.
CPC ................ *H04L 12/40013* (2013.01)

(58) Field of Classification Search
USPC ................................ 710/105, 110
See application file for complete search history.

(56) References Cited

U.S. PATENT DOCUMENTS

| 3,729,586 | A | | 4/1973 | Chow |
| 3,831,142 | A | | 8/1974 | Fletcher et al. |
| 4,691,280 | A | * | 9/1987 | Bennett .................... 710/305 |
| 5,179,663 | A | * | 1/1993 | Iimura ...................... 710/35 |
| 5,369,749 | A | * | 11/1994 | Baker et al. ............... 718/104 |
| 5,533,039 | A | | 7/1996 | Boyer |
| 5,623,677 | A | * | 4/1997 | Townsley et al. .......... 713/310 |

(Continued)

FOREIGN PATENT DOCUMENTS

| CA | 1307352 C | * | 9/1992 | ............. G06F 13/16 |
| CA | 2027334 C | * | 6/2000 | ............. G06F 15/16 |

(Continued)

OTHER PUBLICATIONS

Xiaodong Zhang, "System effects of interprocessor communication latency in multicomputers," Micro, IEEE , vol. 11, No. 2, pp. 12-15, Apr. 1991.*

(Continued)

*Primary Examiner* — Faisal M Zaman
(74) *Attorney, Agent, or Firm* — Howard Seo

(57) ABSTRACT

Methods, systems, apparatuses, and computer-readable media for controlling components connected to and/or otherwise associated with a data bus are presented. According to one or more aspects of the disclosure, a plurality of processing devices having data bus management capability and at least one data bus associated with the plurality of processing devices may be identified. Subsequently, an inter-processor communication (IPC) layer for communication between the plurality of processing devices and the at least one data bus may be established over a messaging layer utilized by the at least one data bus. At least one component associated with the at least one data bus may then be controlled via the IPC layer using at least one of the plurality of processing devices.

41 Claims, 7 Drawing Sheets

(56) References Cited

U.S. PATENT DOCUMENTS

| | | | |
|---|---|---|---|
| 5,710,775 A | 1/1998 | Nakayasu | |
| 5,903,775 A | 5/1999 | Murray | |
| 6,094,700 A | 7/2000 | Deschepper et al. | |
| 7,197,589 B1 * | 3/2007 | Deneroff et al. | 710/302 |
| 7,200,692 B2 | 4/2007 | Singla et al. | |
| 7,752,374 B2 | 7/2010 | Cassidy | |
| 7,848,232 B2 | 12/2010 | Loffink et al. | |
| 7,849,245 B2 | 12/2010 | Travis | |
| 7,903,642 B2 | 3/2011 | Voutilainen et al. | |
| 8,413,006 B1 | 4/2013 | Mok et al. | |
| 2002/0091826 A1 * | 7/2002 | Comeau et al. | 709/226 |
| 2004/0059862 A1 * | 3/2004 | Chan | 710/316 |
| 2004/0225805 A1 | 11/2004 | Vasudevan | |
| 2005/0027904 A1 * | 2/2005 | Khawand et al. | 710/30 |
| 2005/0080944 A1 | 4/2005 | Tomitsuka et al. | |
| 2005/0148358 A1 * | 7/2005 | Lin et al. | 455/550.1 |
| 2006/0179145 A1 * | 8/2006 | Khawand | 709/227 |
| 2008/0215781 A1 * | 9/2008 | Lee et al. | 710/110 |
| 2009/0141654 A1 | 6/2009 | Voutilainen et al. | |
| 2009/0313408 A1 * | 12/2009 | Yanagawa | 710/105 |
| 2010/0191995 A1 | 7/2010 | Levy et al. | |
| 2011/0007680 A1 | 1/2011 | Kadous et al. | |
| 2011/0280204 A1 * | 11/2011 | Nourbakhsh et al. | 370/329 |
| 2011/0320841 A1 | 12/2011 | Sinha | |
| 2012/0278518 A1 | 11/2012 | Gruber et al. | |
| 2012/0278646 A1 | 11/2012 | Gruber et al. | |

FOREIGN PATENT DOCUMENTS

| | | | | |
|---|---|---|---|---|
| CN | 101710737 A * | 5/2010 | | H02J 13/00 |
| CN | 201535874 U * | 7/2010 | | G05B 19/418 |
| CN | 103530247 A * | 1/2014 | | G06F 13/37 |
| EP | 2738681 A1 * | 6/2014 | | G06F 13/10 |
| JP | H0329043 A | 2/1991 | | |
| JP | H05276178 A | 10/1993 | | |
| JP | 2004525579 A | 8/2004 | | |
| JP | 2005518252 A | 6/2005 | | |
| JP | 2010034809 A | 2/2010 | | |
| JP | 2010263321 A | 11/2010 | | |
| JP | 2014508597 A | 4/2014 | | |
| KR | 970002412 B1 * | 3/1997 | | G06F 13/28 |
| WO | 02088967 A1 | 11/2002 | | |
| WO | 03072160 A2 | 9/2003 | | |
| WO | 2010055347 A1 | 5/2010 | | |

OTHER PUBLICATIONS

Jagadish et al., "An efficient scheme for interprocessor communication using dual-ported RAMs," Micro, IEEE, vol. 9, No. 5, pp. 10-19, Oct. 1989.*

Sakai et al., "RICA: Reduced Interprocessor-Communication Architecture—concept and mechanisms,"Parallel and Distributed Processing, 1993. Proceedings of the Fifth IEEE Symposium on, pp. 122-125, Dec. 1-4, 1993.*

Decaluwe et al., "Interprocessor communication in synchronous multiprocessor digital signal processing chips," Acoustics, Speech and Signal Processing, IEEE Transactions on, vol. 37, No. 12, pp. 1816-1828, Dec. 1989.*

International Search Report and Written Opinion—PCT/US2012/035436—ISA/EPO—Jul. 25, 2012.

Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

* cited by examiner

MULTIPLE SLIMBUS CONTROLLERS FOR SLIMBUS COMPONENTS

CROSS-REFERENCES TO RELATED APPLICATIONS

This application claims the benefit of U.S. Provisional Application No. 61/481,051, filed Apr. 29, 2011, entitled "MULTIPLE SLIMBUS CONTROLLER FOR SLIMBUS COMPONENTS," and assigned, and which is hereby incorporated by reference herein in its entirety for all purposes.

BACKGROUND

Computing devices are incredibly widespread in today's society. For example, people use laptop and/or desktop computers, smart phones, personal digital assistants, tablet computers, etc., to perform a wide array of computing tasks. Moreover, advancements in device technology have greatly increased the versatility of today's computing devices, enabling users to perform a wide range of tasks from a single, compact and/or portable device that conventionally required either multiple devices or larger, cumbersome and/or non-portable equipment.

Computing devices can provide functionality via one or more components (e.g., input/output (I/O) devices, processing devices, memory components, etc.), which may communicate with each other via a data bus. A data bus may be a serial data bus, such as a Serial Low-power Inter-chip Media Bus (SLIMbus). Components associated with a data bus can also be associated with respective processing devices. A data bus is additionally associated with a device manager, which includes various elements utilized for managing devices and/or components associated with the data bus. Conventionally, a device manager is controlled by a single processing device. Thus, a data bus and its corresponding device manager are duplicated for respective processing devices in the event that bus components are to be controlled by multiple processing devices.

SUMMARY

Aspects of the disclosure relate to more convenient, more efficient, and/or more effective methods, systems, apparatuses, and computer-readable media for controlling components connected to and/or otherwise associated with a data bus. In particular, aspects of the disclosure relate to systems and methods that provide for communication between processing devices so as to enable coordination between multiple such devices for control of a single data bus and its associated components. According to one or more aspects, such communication between processing devices associated with a data bus is enabled and/or facilitated by layering an inter-processor communication (IPC) layer onto a messaging layer utilized by the data bus, by implementing IPC interfaces between the respective processing devices associated with the data bus, and/or by other techniques described in greater detail below.

According to one or more aspects of the disclosure, a plurality of processing devices having data bus management capability and at least one data bus associated with the plurality of processing devices may be identified. Subsequently, an IPC layer for communication between the plurality of processing devices and the at least one data bus may be established over a messaging layer utilized by the at least one data bus. At least one component associated with the at least one data bus may then be controlled via the IPC layer using at least one of the plurality of processing devices.

In at least one arrangement, the plurality of processing devices may each be associated with a corresponding data bus. In one or more additional and/or alternative arrangements, at least one of the plurality of processing devices might not be associated with a corresponding data bus. In at least one additional arrangement, the at least one data bus may be a SLIMbus. In still other additional and/or alternative arrangements, the IPC layer may utilize a first messaging protocol that is different from a second messaging protocol associated with the messaging layer utilized by the at least one data bus. For instance, the IPC layer might not need to use the same protocol that the at least one data bus normally uses (e.g., an IPC layer that is layered over a SLIMbus layer might not need to conform to the SLIMbus messaging protocol).

In still other arrangements, controlling at least one component associated with the data bus may include controlling the at least one component via a data bus management entity shared among the plurality of processing devices. In some instances, access to the data bus management entity may be limited to one of the plurality of processing devices at a time. In yet other arrangements, controlling at least one component associated with the data bus may include controlling the at least one component via a manager associated with one of the plurality of processing devices and a framer shared among the plurality of processing devices.

According to one or more additional and/or alternative aspects of the disclosure, a plurality of processing devices having data bus management capability and at least one data bus associated with the plurality of processing devices may be identified. Subsequently, communication interfaces may be established between respective ones of the plurality of processing devices. At least one component associated with the at least one data bus may then be controlled using at least one of the plurality of processing devices via the communication interfaces established between the respective ones of the plurality of processing devices.

In at least one arrangement, the plurality of processing devices may each be associated with a corresponding data bus, and/or at least one of the plurality of processing devices might not be associated with a corresponding data bus. In at least one additional arrangement, the at least one data bus may comprise a SLIMbus. In still other additional and/or alternative arrangements, controlling the at least one component may include controlling the at least one component via a data bus management entity shared among the plurality of processing devices. In some instances, access to the data bus management entity may be limited to one of the plurality of processing devices at a time. Additionally or alternatively, controlling the at least one component may further include conducting a handover of data bus control from a first processing device of the plurality of processing devices to a second processing device of the plurality of processing devices.

In still other arrangements, controlling the at least one component may include controlling the at least one component via a manager associated with one of the plurality of processing devices and a framer shared among the plurality of processing devices. In one or more arrangements, the communication interfaces may comprise at least one of High Speed Inter-Chip (HSIC), High-Speed Synchronous Serial Interface (HIS), Serial Peripheral Interface (SPI), universal asynchronous receiver/transmitter (UART), dual-ported random access memory (RAM) interface, or PCI (Peripheral Component Interconnect) Express (PCIe).

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems and methods for sharing control of components associated with a bus, such as a SLIMbus or the like, are provided herein. Management of components and/or devices associated with a data bus is performed using a device manager, which can include one or more elements such as a manager, a framer, etc. In conventional data bus implementations, a device manager is controlled with a single processing device. As a result, if it is desired to control the data bus via multiple processing devices, the data bus and its device manager are duplicated for each such processing device. The systems and methods herein provide for communication between processing devices to enable coordination between multiple such devices for control of a single data bus and its associated components. Communication between processing devices associated with a data bus as described herein is enabled via layering an inter-processor communication (IPC) layer onto a messaging layer utilized by the data bus, by implementing IPC interfaces between the respective processing devices associated with the data bus, and/or other techniques as described herein.

Items and/or techniques described herein may provide one or more of the following capabilities, as well as other capabilities not mentioned. A single bus implementation can be used in a multi-processor system, reducing the size of the system and increasing its efficiency by reducing the number of bus instantiations. Control of bus components can be conducted by multiple processing devices with improved speed and efficiency. Data buses and bus components can be allocated with increased flexibility to support component grouping and other benefits. Integration of multiple data buses, bus components and processing devices within a given device can be done with greater flexibility. While at least one item/technique-effect pair has been described, it may be possible for a noted effect to be achieved by means other than that noted, and a noted item/technique may not necessarily yield the noted effect.

Figure 1:
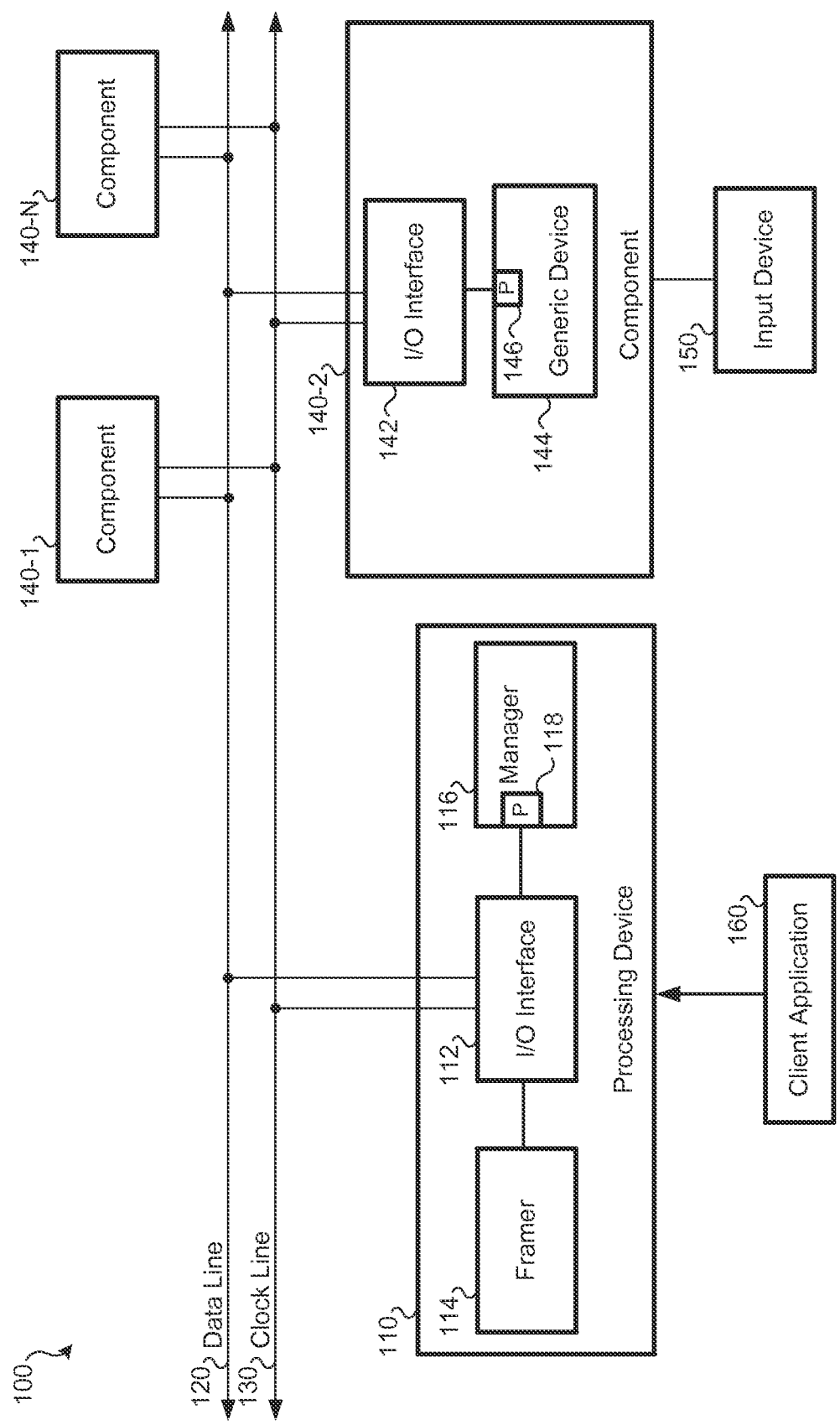
FIG. 1 is a graphical illustration of an example data bus architecture.

FIG. 1 illustrates a simplified block diagram of an embodiment of a system 100 using a serial data bus, such as a SLIMbus. Such a data bus may be used in a mobile device such that audio, data, bus, and device control may occur on a single data bus. Such a data bus may allow for multiple audio and data channels to use the same data bus. Further, different sample rates for different audio channels may be supported at the same time. System 100 includes one or more processing devices 110 (which include I/O interface 112, framer 114, and manager 116), a data line 120, a clock line 130, and various components 140. While various discussion herein pertains to the SLIMbus protocol, other protocols or operating modes may be used by the data bus.

A processing device 110 may be a central processing unit (CPU), a digital signal processor (DSP), a state machine, a microcontroller (MCU) or other controller, a state machine, a lookup table, etc. For purposes of power optimization or other factors, a system may utilize multiple processing devices 110. A processing device 110 may manage a data bus that comprises data line 120 and clock line 130. The data bus can be, and/or include the functionality of, a SLIMbus and/or any other suitable bus architecture(s). A processing device 110 may include an I/O interface 112. The I/O interface 112 provides management services for the data bus, control a frame layer of the bus, monitor message protocols implemented using processing device 110, manage resets of processing device 110, etc.

The framer 114 of processing device 110 serves as the source for the clock signal driven on clock line 130. As such, the clock signal provided by framer 114 is provided to all devices and components 140 connected with clock line 130. Framer 114 may have the ability to enter multiple clock modes, such as an active clock mode and a paused clock mode. When in the active clock mode, framer 114 supplies an active clock signal to clock line 130. When in active clock mode, data are transmitted by processing device 110 or one of the components 140 via the data bus. In the paused clock mode, framer 114 holds the clock line 130 in a single state (e.g., such that the logical value of clock line 130 does not change). For instance, the clock line 130 may be held to a logical value of one. While in the paused clock mode, data are not transmitted using the data bus. Additionally, framer 114 transmits guide and framing channels, collectively referred to as "framing information," on data line 120 to other devices and components 140 connected via the data bus. This framing information is used to establish the time division multiplexed (TDM) frame structure of the data bus and communicate such information to other devices and components 140 connected with the bus for establishing synchronization. Further, framer 114 is responsible for booting the data bus.

The manager 116 is responsible for performing data bus administration. Bus administration includes, e.g., enumeration of devices and components 140 connected with the bus, bus configuration, dynamic channel allocation, etc. The manager 116 may also include a port 118, or logical address, on the bus to help enable the manager 116 to perform data bus administration. If multiple managers 116 are connected with the data bus, only one manager 116 is permitted to be active at a given time.

While the I/O interface 112, framer 114, and manager 116 are illustrated as part of (or as being executed by) processing device 110, in some embodiments some or all of these components may be in separate components that are connected via the data bus. For example, while manager 116 is illustrated in FIG. 1 as present in the same processor 110 as framer 114, manager 116 and framer 114 may alternatively be associated with separate physical components.

FIG. 1 further illustrates three components (140-1, 140-2, and 140-N) as connected with the data line 120 and clock line 130 of the data bus. Here, "component of the data bus" and "component" are general terms for a device that is connected with the data bus. Components provide various application functionality, such as analog to digital conversion (ADC), digital to analog conversion (DAC), and/or any other suitable functionality. As an example, a component, such as component 140-1, may be a processor, such as a CPU or DSP that is connected to a microphone. When information is received by the component processor from the microphone, the information may be digitized, analyzed, and, if the data is to be transmitted to one or more other devices connected with the data bus, transmitted using the data bus. While system 100 illustrates three components 140, greater or fewer components may be connected with the data bus.

For simplicity, additional detail has been shown in only component 140-2. A component 140 may contain various devices, such as an I/O interface 142 and generic device 144. These devices permit component 140-2 to communicate via the data bus and to receive and analyze data from other devices, respectively. For example, the generic device 144 can enable the exchange of data with a device such as input device 150. The generic device may include a port 146, or logical address on the data bus, to help enable the data exchange. While not shown in FIG. 1, similar detail may also be present in component 140-1 and 140-N.

Components 140 and processing devices 110 may be associated with one or more ports 118 and 146 that are merged onto the bus. Any number (e.g., 32, 64, etc.) of ports 118 and 146 can be utilized on each device, as dictated by the standards of the data bus. Ports 118 and 146 are logical addresses of the bus (having corresponding physical connections to the data bus), utilized for access to a data channel associated with the data bus. Put another way, a port is a logical end to a data channel, and a data channel can be set up between two ports that can be dynamically and logically connected with the data channel. The ports 118 and 146 provide a mechanism by which communication can be coordinated on a data bus via TDM. For example, different TDM time slots can be are allocated for various ports 118 and 146 at various times. Such time slots can be uniform or non-uniform. Further, depending on whether a given port 118 or 146 is a source or destination at a given time, the time slots provide for either sourcing or sampling of data from the corresponding data bus. Additionally, as discussed in further detail below, some devices may be connected with the data bus, but have no corresponding logical address, and therefore no port. Such non-ported devices can be configured to communicate on message channels of the data bus.

While I/O interfaces 112 and 142 are shown in FIG. 1 as associated with ported devices, I/O interfaces 112 and 142 may associate with any number of generic devices, non-ported generic devices or ports, including zero devices and/or ports. In the event that an I/O interface 112 or 142 is associated with no devices or ports, a framer 114 associated with the data bus may nonetheless continue to provide a clock signal to the bus components.

Additionally, the data bus illustrated may operate using a multi-drop bus topology, where bus signals are common to all components on the bus. To prevent interference between components on the bus, the data bus is configured such that only one transmitter device communicates on the bus at any given time. This constraint may be enforced through an arbitration procedure and/or other collision avoidance mechanisms.

While the above description provides a basic primer on how devices and components 140 on a data bus (such as a SLIMbus) may communicate, it should be understood that additional components may be present that are not illustrated for simplicity. For example, the processor 110 and component (s) 140 may have one or more buffers to buffer data that is to be transmitted using the data bus and/or to buffer data that is being received via the data bus. Additional information may be found in the specification for the specific form of data bus being used. For example, Version 1.01 of the SLIMbus specification, published by the Mobile Industry Processor Interface (MIPI) Alliance, provides additional information regarding the implementation of SLIMbus systems.

The data bus of system 100 uses a synchronous, two-wire data bus to distribute data between devices connected with the clock line and data line. As discussed above, the data bus can utilize a TDM scheme to allow multiple receiving and transmitting devices to utilize and communicate through the data bus. Here, the organization of data as distributed in time using the data bus is referred to as the "frame structure." The frame structure of data transmitted via the data bus, if a SLIMbus, may have five subparts: cells, slots, frames, subframes, and superframes. A "cell" refers to the smallest subdivision of data transported using the data bus. A cell is bounded by two consecutive positive boundaries of the clock signal and holds a single bit of information. A "slot" refers to four contiguous cells. A slot, therefore, contains four bits of information. The bits may be from most significant bit to least significant bit. A "frame" is defined as 192 contiguous slots. The first slot of a frame may be a control space slot that contains a four bit frame sync (synchronization) symbol. This frame sync symbol may be the binary sequence "1011." Similarly, slot 96 of each frame may be a control space slot that contains four bits of framing information. The frame sync data and 32 bits of framing information may be used to synchronize the data bus. To receive all 32 bits of framing information, data may be read from slot 96 of eight successive frames. These eight successive frames are referred to as a "superframe."

If synchronization is lost by a device connected with the data bus, a superframe being transmitted may not be able to be read by the device. Referring to SLIMbus, an amount of tolerance has been designed in such that, if a single frame-sync slot is not as expected, the data of the superframe may still be read properly by the device. However, if a second consecutive frame sync slot is in error, then data in the superframe shall not be read by the device.

A "subframe" is defined as a division of the frame structure at which control space and data space are interleaved. Regardless, the first slot of a frame is allocated to control space. Subframes may not have a single, fixed length. Rather, subframe length may be varied among various, predefined lengths. Referring to SLIMbus, the length may be programmable to 6, 8, 24, or 32 contiguous slots (i.e., 24, 32, 96, or 128 cells). In SLIMbus, the subframe configuration may be dynamically varied based on factors such as the data flow requirements of applications being supported by the SLIMbus at the time.

With this topology, a client application 160 can gain access to any component 140 on the data bus through the processing device 110. The client application 160 can include any of a variety of functions, such as music playback, audio recording, data transfer, and more, that might require access to one or more components 140 on the bus. For example, if the client application 160 is an audio recording application and the input device 150 is a microphone, the client application 160 can access the input device 150 by communicating the need to access the input device 150 to the processing device 110. The processing device, using the manager 116, arranges for a data channel to be setup on the data bus for access to the input device 150 and communicates the request to component 140-2 in accordance with the specifications of the data bus. After receiving the request from the processing device 110, the component 140-2 can receive an analog audio input from the input device 150 and convert it to a digital format using generic device 144, which can be an ADC. Once in a digital format, the component 140 can communicate the data from the input device through the data bus back to the processing device 110 using the I/O interface 142. Finally, the processing device 110 can then provide the data to the client application 160. Thus, the client application 160 gains access to bus components 140 through the processing device 110.

Figure 2:
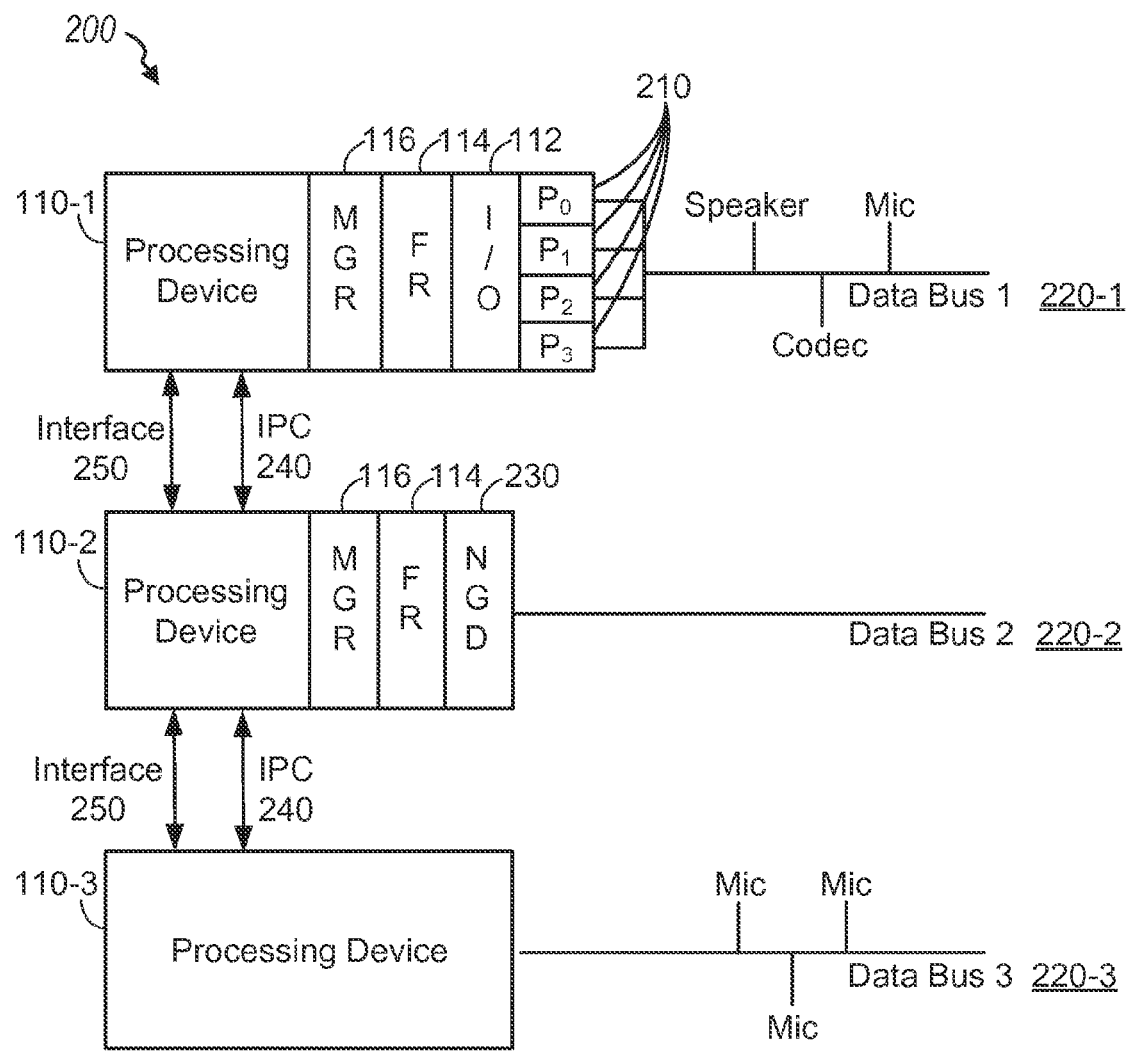
FIGS. 2-3 are block diagrams of systems for sharing control of SLIMbus components among multiple processing devices.

FIG. 2 illustrates a system 200 for sharing control of bus components among multiple processing devices. System 200 includes processing devices 110-1, 110-2 and 110-3, each of which may be associated with a respective data bus 220-1, 220-2 and 220-3. As described above, processing devices 110 can be, or include, central processing units (CPUs), digital signal processors (DSPs), state machines, controllers, lookup tables, etc. While each processing device 110 is illustrated in FIG. 2 as associated with a data bus 220, one or more processing devices 110 may alternatively be associated with no data bus 220 or multiple data buses. Further, processing devices 110 may share a connection with a single data bus 220. Processing devices 110 can be associated with an I/O interface 112, a framer 114 and/or a manager 116 as described above. Each bus may provide communicative coupling for one or more other devices, such as a speaker, microphone, codec, etc. Processing devices 110 can be associated with a single, common chipset or multiple chipsets.

A device manager can be defined as including a framer 114, manager 116 and/or other entities utilized for managing devices associated with a data bus. A device manager is controlled by a single entity, such as a processing device 110. For purposes of power optimization or other factors, a system may utilize multiple processing devices 110. Conventionally, a device manager is controlled by a single processing device 110 As a result, a data bus 220 and its corresponding device manager are duplicated for respective processing devices 110 in the event that bus components are to be controlled by multiple processing devices 110.

In contrast to the above, system 200 utilizes one or more communication mechanisms between processing devices 110 to enable coordination between processing devices 110 for control of associated bus components, which enables the master and other data bus component units to be seamlessly controlled by the different processing devices 110. This allows faster control and flexible integration, e.g., by enabling several processing devices 110 to control a device manager associated with a data bus 220 and/or otherwise assume management of a data bus 220 and devices associated therewith.

As shown by system 200, multiple different controllers, e.g., processing devices 110 located on the same chip or different chips, can be operable to act as "pseudo" controllers such that the processing devices 110 have shared control of a device manager associated with a common data bus 220. As a result, a single bus implementation can be utilized instead of several instantiations and microarchitecture.

A processing device 110 operating as a controller for a data bus architecture may be given control of a limited subset of devices associated with the data bus 220. Subsets of devices may be divided based on device type and/or other characteristics. For instance, FIG. 2 shows that processing device 110-3 controls microphone devices via data bus 220-3, while other processing devices 110 within the system may similarly control devices of respective types. In such an implementation the processing devices 110 may maintain a single data bus 220 or multiple data buses 220.

While FIG. 2 illustrates processing devices 110 each connected to a respective data bus 220, one or more processing devices 110 may not be directly connected to a corresponding data bus 220. For instance, in the event that system 200 is implemented without data bus 220-2, processing device 110-2 could utilize the techniques described herein to control communication on data bus 220-1 and/or any other bus within system 200. More generally, processing devices 110 within system 200 are operable to control any device on any data bus 220 using the techniques described herein.

Inter-processor interaction may be performed in a variety of manners. For example, an inter-processor communication (IPC) protocol can be implemented between the processing devices 110 and layered over the data bus protocol (e.g., the SLIMbus protocol) such that messaging between the processing devices 110 occurs on a designated IPC layer 240 over a data bus 220 that provides a connection between the processing devices. An IPC layer 240 implemented using a data bus 220 in this manner can be utilized to carry any suitable data and/or channels between processing devices 110 that are capable of being sent over the bandwidth of the data bus 220. For instance, the IPC layer 240 may carry data associated with one or more data channels, messaging channels, or the like.

Alternatively, one or more existing interfaces 250, such as an High Speed Inter-Chip (HSIC) interface, a High-Speed Synchronous Serial Interface (HIS), a Serial Peripheral Interface (SPI), a universal asynchronous receiver/transmitter (UART) interface, a dual-ported random access memory (RAM) interface, PCI (Peripheral Component Interconnect) Express (PCIe), etc., can be implemented between processing devices 110 to enable the processing devices 110 to negotiate for control of the data bus. In such a case, processing devices 110 may interact to perform pseudo-handover operations and/or other suitable mechanisms to pass control of a manager 116, framer 114, etc., associated with a data bus 220 between each other.

Figure 3:
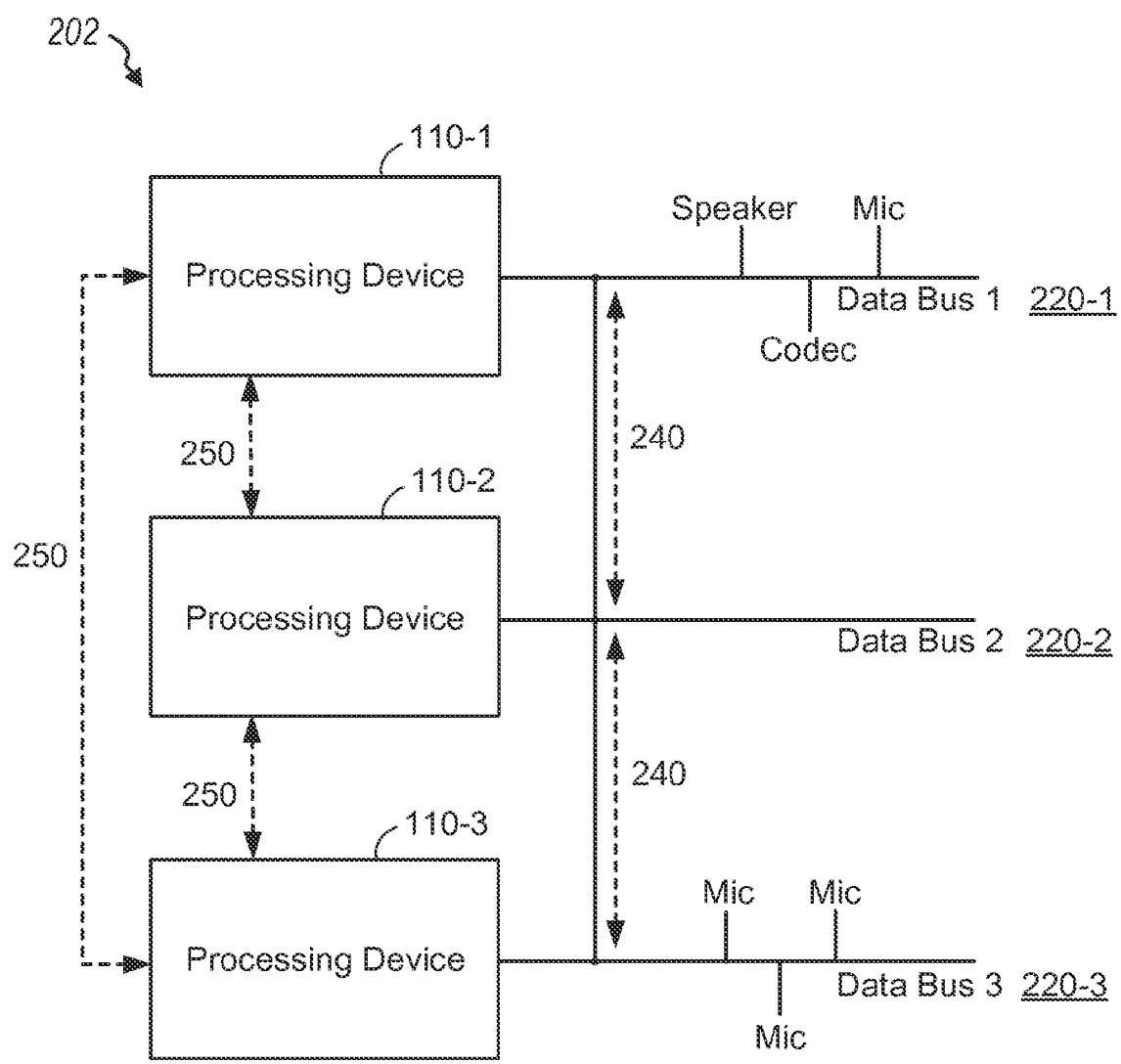

To further illustrate the above, system 200 in FIG. 3 shows further examples by which an IPC layer 240 and/or interfaces 250 can be implemented in order to enable multiple processing devices 110 to control a set of components associated with one or more data buses 220. As noted above, the IPC layer 240 can be utilized to enable the processing devices 110 to communicate with each other, thereby enabling mutual control of bus components. In the event that a data bus 220 is a SLIMbus, messages communicated over the IPC layer can be carried on the message channel of the SLIMbus protocol. Other bus implementations and/or channel structures are also possible. Additionally or alternatively, one or more existing interfaces 250 utilized for IPC can be leveraged by the various processing devices 110 as an independent communication channel in order to enable the processing devices 110 to communicate for bus control.

The IPC layer 240 and/or interfaces 250 illustrated in FIGS. 2-3 can be utilized in a uniform manner across all processing devices 110, and/or a hybrid implementation can be employed wherein an IPC layer 240 connects a first subset of processing devices 110 and one or more interfaces 250 connect a second subset. For instance, in the event that a first processing device 110 is not connected to a data bus 220 but other processing devices 110 are connected to the data bus 220, the processing devices 110 connected to the data bus 220 can communicate with each other via an IPC layer 240, while processing devices 110 not connected to the data bus 220 can transmit and/or receive messages over one or more interfaces 250 to other processing devices 110.

As provided above, by utilizing an IPC layer 240 and/or interfaces 250, bus component management is provided with increased flexibility for various implementation cases. For instance, a first processor connected to a data bus and a manager and framer associated with the data bus can utilize the techniques provided herein to enable a second processor that is not connected to the data bus to nonetheless control communication on the data bus. Similarly, if the second processor is connected to a second data bus and an associated manager and framer, the first processor can utilize the techniques provided herein to control communication on the second data bus even if the first processor is not connected to the second data bus. Similar implementations would also apply to any number of processing devices and/or data buses.

Referring again to system 200 in FIG. 2, a bus device or component may be associated with one or more ports 210 that are merged onto the bus. While four ports 210 are shown as associated with data bus 220-1, any number (e.g., 32, 64, etc.) of ports 210 can be utilized. Ports 210 are utilized for access to a data channel associated with the data bus 220. The ports 210 provides a mechanism by which communication can be coordinated on a data bus 220 via TDM, in which various ports 210 can be given uniform or non-uniform time slot allocations. Depending on whether a given port 210 is a source or destination at a given time, allocated time slots provide for either sourcing or sampling of data from the corresponding data bus 220. As an alternative to the ported configuration shown at processing device 110-1, a data bus 220 can also be associated with a non-ported generic device 230, which has no ports 210 but is also capable of messaging over the data bus 220.

Figure 4:
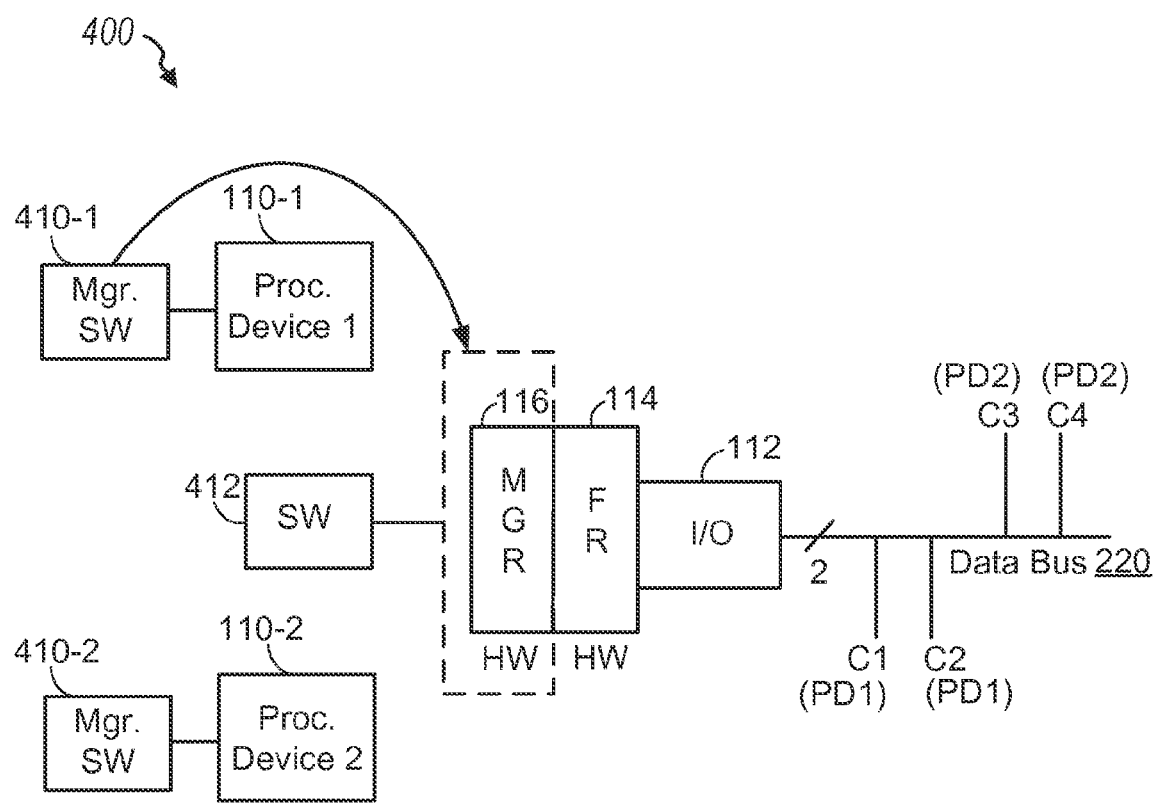
FIG. 4 is a diagram of a system for controlling management of SLIMbus components via a plurality of processing devices.

Coordination of data bus management among multiple processing devices 110 is shown in further detail by system 400 in FIG. 4. FIG. 4 illustrates a hardware-implemented manager 116 and framer 114 that utilize processing devices 110-1 and 110-2, each of which are respectively associated with manager software 410-1 and 410-2. Alternatively, the manager 116 may be at least partially implemented in software via a software block 412. For instance, the manager 116 may perform one or more functions via software, such as bus configuration or the like, and can cooperate with the hardware-based framer to control the data bus 220. Further, while the manager 116 is illustrated in FIG. 4 as a standalone block, manager functionality can be implemented wholly or in part at respective processing devices 110.

The manager 116 and framer 114 provide communication functionality for a set of components over a data bus 220 via an I/O interface 112. The data bus 220 is illustrated as a 2-wire bus capable of carrying 2 bits (e.g., a clock bit and a data bit) at a given time; however, the data bus 220 may alternatively include any suitable number of wires and/or allow for any amount of data to be communicated at a given time. As shown by system 400, the various components may be controlled by different processing devices 110 in the system 400. Thus, in contrast to conventional approaches where the data bus 220 is replicated for each processing device 110, functionality of the manager 116 can be shared among processing devices 110-1 and 110-2 as described herein to facilitate shared control of a single bus. Transitions of control between processing devices 110-1 and 110-2 may occur via inter-processor communication as described above such that only one processing device 110 is in control of the data bus 220 at a given time.

Figure 5:
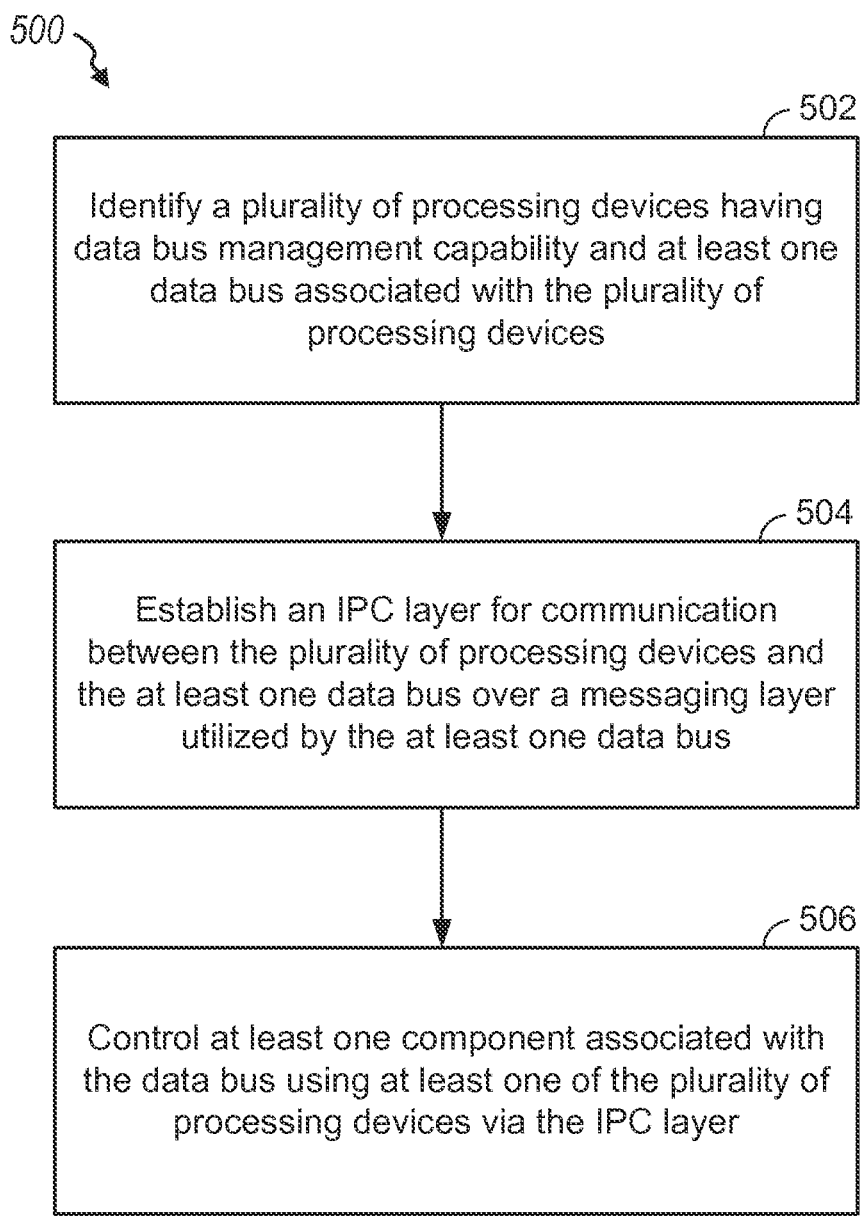
FIGS. 5-6 are block flow diagrams of respective processes of using multiple SLIMbus controllers for respective SLIMbus components.

Turning to FIG. 5, with further reference to FIGS. 1-4, a process 500 of using multiple bus controllers for respective bus components includes the stages shown. The process 500 is, however, an example only and not limiting. The process 500 can be altered, e.g., by having stages added, removed, rearranged, combined, and/or performed concurrently. Still other alterations to the process 500 as shown and described are possible. At stage 502, a plurality of processing devices (e.g., processing devices 110) having data bus management capability and at least one data bus (e.g., a data bus 220) associated with the plurality of processing devices are identified. At stage 504, an IPC layer (e.g., IPC layer 240) is established for communication between the plurality of processing devices and the at least one data bus over a messaging layer utilized by the at least one data bus. At stage 506, at least one component associated with the data bus is controlled using at least one of the plurality of processing devices via the IPC layer.

Figure 6:
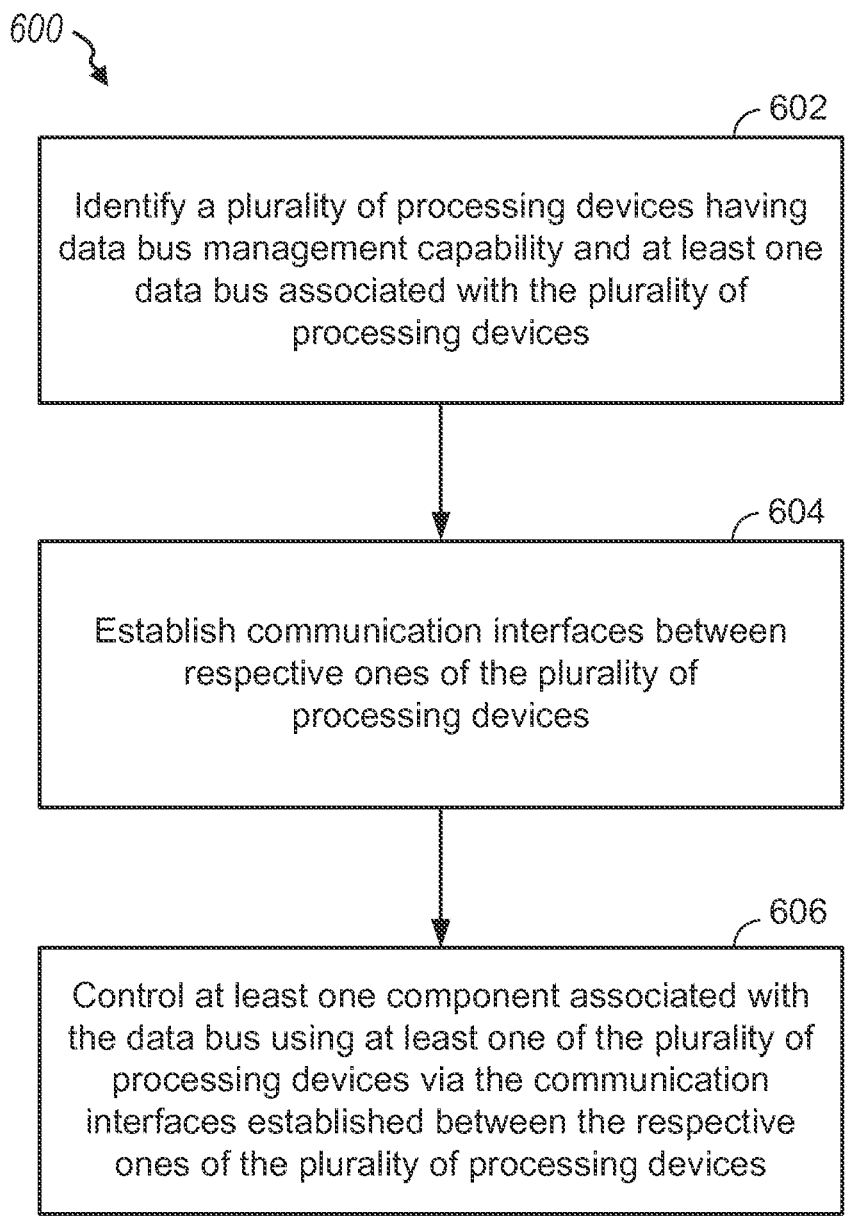

Turning to FIG. 6, with further reference to FIGS. 1-4, another process 600 of using multiple bus controllers for respective bus components includes the stages shown. The process 600 is, however, an example only and not limiting. The process 600 can be altered, e.g., by having stages added, removed, rearranged, combined, and/or performed concurrently. Still other alterations to the process 600 as shown and described are possible. At stage 602, a plurality of processing devices (e.g., processing devices 110) having data bus management capability and at least one data bus (e.g., a data bus 220) associated with the plurality of processing devices are identified. At stage 604, communication interfaces (e.g., interfaces 250) are established between respective ones of the plurality of processing devices. At stage 606, at least one component associated with the data bus is controlled using at least one of the plurality of processing devices via the communication interfaces established between the respective ones of the plurality of processing devices.

Figure 7:
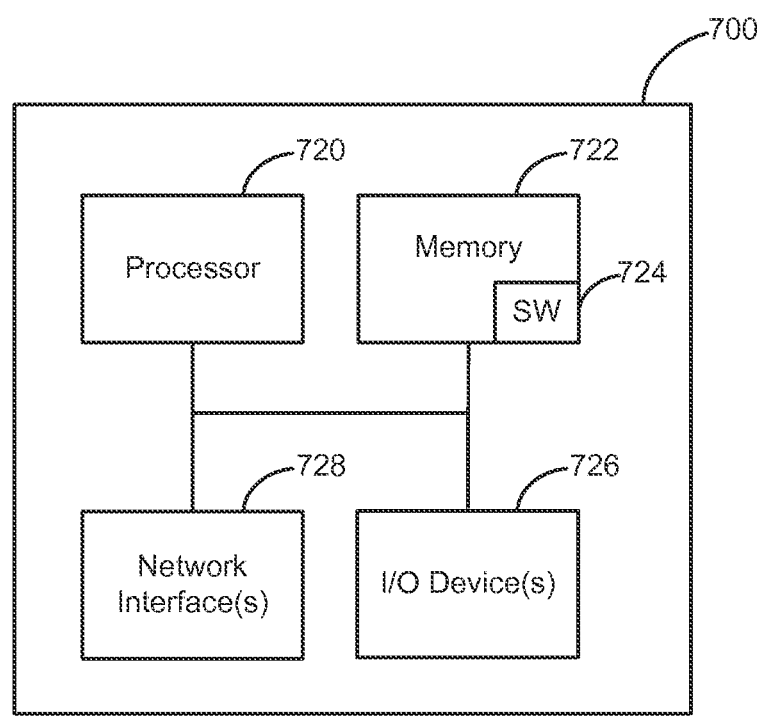
FIG. 7 is a block diagram illustrating components of an example computing device.

Referring to FIG. 7, an example computing device 700 is illustrated, in which some or all of the embodiments described herein can be implemented. The computing device 700 includes at least one processor 720, memory 722 including software 724, input/output (I/O) device(s) 726 (e.g., a display, speaker, keypad, touch screen or touchpad, etc.), and a network interface 728. The network interface 728 facilitates bi-directional communication between the device 700 and one or more network entities, and/or any other suitable component(s).

The processor 720 is an intelligent hardware device, e.g., a central processing unit (CPU) such as those made by Intel® Corporation or AMD®, a microcontroller, an application specific integrated circuit (ASIC), etc. The memory 722 includes non-transitory storage media such as random access memory (RAM) and read-only memory (ROM). The memory 722 stores the software 724 which is computer-readable, computer-executable software code containing instructions that are configured to, when executed, cause the processor 720 to perform various functions described herein. Alternatively, the software 724 may not be directly executable by the processor 120 but is configured to cause the computer, e.g., when compiled and executed, to perform the functions.

While the computing device 700 is illustrated by FIG. 7 as including one each of components 720-728, the computing device 700 may also include multiple such components, or may not include one or more of the components. For instance, the computing device 700 may include multiple processors 720, which cooperate to control bus components as described above. Further, the computing device 700 may include no I/O devices 726 and/or The computing device 700 as described above is provided as an example and is not intended to limit the subject matter described and claimed herein. For instance, one or more embodiments described herein can be implemented in any suitable device or combination of devices, which may utilize similar structure to that shown in FIG. 7 or different structure.

One or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4, and/or 7 may be configured to perform one or more of the methods, features, or steps described in FIGS. 5 and/or 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium," "computer-readable medium," and/or "processor-readable medium" may include, but are not limited to portable or fixed storage devices, optical storage devices, and various other non-transitory mediums capable of storing, containing or carrying instruction(s) and/or data. Thus, the various methods described herein, such as the methods illustrated in and/or described above with respect to FIGS. 5 and 6, may be partially or fully implemented by instructions and/or data that may be stored in a "machine-readable medium," "computer-readable medium," and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method comprising:
identifying a plurality of processing devices having data bus management capability and at least one data bus associated with the plurality of processing devices;
establishing an inter-processor communication (IPC) layer for communication between the plurality of processing devices and the at least one data bus over a messaging layer utilized by the at least one data bus; and
controlling at least one component associated with the at least one data bus using at least one of the plurality of processing devices via the IPC layer;
wherein the plurality of processing devices comprises a first processing device and a second processing device, the first processing device coupled to a first data bus manager for performing data bus administration for the at least one data bus; and
wherein controlling the at least one component associated with the at least one data bus comprises passing control of the first data bus manager from the first processing device to the second processing device, by utilizing the IPC layer between the first processing device and the second processing device and without connecting the first data bus manager to the second processing device.

2. The method of claim 1 wherein the plurality of processing devices are each associated with a corresponding data bus.

3. The method of claim 1 wherein at least one of the plurality of processing devices is not associated with a corresponding data bus.

4. The method of claim 1 wherein the at least one data bus comprises a SLIMbus.

5. The method of claim 1 wherein the IPC layer utilizes a first messaging protocol that is different from a second messaging protocol associated with the messaging layer utilized by the at least one data bus.

6. The method of claim 1 wherein the data bus manager is shared among the plurality of processing devices.

7. The method of claim 6 wherein access to the data bus manager is limited to one of the plurality of processing devices at a time.

8. The method of claim 1 wherein the controlling comprises controlling the at least one component via the data bus manager, associated with one of the plurality of processing devices, and a framer shared among the plurality of processing devices.

9. A method comprising:
identifying a plurality of processing devices having data bus management capability and at least one data bus associated with the plurality of processing devices;
establishing communication interfaces between respective ones of the plurality of processing devices with the at least one data bus; and
controlling at least one component associated with the at least one data bus using at least one of the plurality of processing devices via the communication interfaces established between the respective ones of the plurality of processing devices;
wherein the plurality of processing devices comprises a first processing device and a second processing device, the first processing device coupled to a first data bus manager for performing data bus administration for the at least one data bus; and
wherein controlling the at least one component associated with the at least one data bus comprises passing control of the first data bus manager from the first processing device to the second processing device, by utilizing a communication interface between the first processing device and the second processing device and without connecting the first data bus manager to the second processing device.

10. The method of claim 9 wherein the plurality of processing devices are each associated with a corresponding data bus.

11. The method of claim 9 wherein at least one of the plurality of processing devices is not associated with a corresponding data bus.

12. The method of claim 9 wherein the at least one data bus comprises a SLIMbus.

13. The method of claim 9 wherein the data bus manager is shared among the plurality of processing devices.

14. The method of claim 13 wherein access to the data bus manager is limited to one of the plurality of processing devices at a time.

15. The method of claim 9 wherein the controlling comprises controlling the at least one component via the data bus manager, associated with one of the plurality of processing devices, and a framer shared among the plurality of processing devices.

16. The method of claim 9 wherein the communication interfaces comprise at least one of High Speed Inter-Chip (HSIC), High-Speed Synchronous Serial Interface (HIS), Serial Peripheral Interface (SPI), universal asynchronous receiver/transmitter (UART), dual-ported random access memory (RAM) interface, or PCI (Peripheral Component Interconnect) Express (PCIe).

17. A system comprising:
means for identifying a plurality of processing devices having data bus management capability and at least one data bus associated with the plurality of processing devices;
means for establishing an IPC layer for communication between the plurality of processing devices and the at least one data bus over a messaging layer utilized by the at least one data bus; and
means for controlling at least one component associated with the at least one data bus using at least one of the plurality of processing devices via the IPC layer;
wherein the plurality of processing devices comprises a first processing device and a second processing device, the first processing device coupled to a first data bus manager for performing data bus administration for the at least one data bus; and
wherein the means for controlling the at least one component associated with the at least one data bus comprises means for passing control of the first data bus manager from the first processing device to the second processing device, by utilizing the IPC layer between the first processing device and the second processing device and without connecting the first data bus manager to the second processing device.

18. The system of claim 17 wherein the at least one data bus comprises a SLIMbus.

19. The system of claim 17 wherein the IPC layer utilizes a first messaging protocol that is different from a second messaging protocol associated with the messaging layer utilized by the at least one data bus.

20. The system of claim 17 wherein the data bus manager is shared among the plurality of processing devices.

21. The system of claim 20 wherein access to the data bus manager is limited to one of the plurality of processing devices at a time.

22. The system of claim 17 wherein the means for controlling comprises means for controlling the at least one component via the data base bus manager, associated with one of the plurality of processing devices, and a framer shared among the plurality of processing devices.

23. A system comprising:
means for identifying a plurality of processing devices having data bus management capability and at least one data bus associated with the plurality of processing devices;
means for establishing communication interfaces between respective ones of the plurality of processing devices with the at least one data bus; and
means for controlling at least one component associated with the at least one data bus using at least one of the plurality of processing devices via the communication interfaces established between the respective ones of the plurality of processing devices;
wherein the plurality of processing devices comprises a first processing device and a second processing device, the first processing device coupled to a first data bus manager for performing data bus administration for the at least one data bus; and
wherein the means for controlling the at least one component associated with the at least one data bus comprises means for passing control of the first data bus manager from the first processing device to the second processing device, by utilizing a communication interface between the first processing device and the second processing device and without connecting the first data bus manager to the second processing device.

24. The system of claim 23 wherein the at least one data bus comprises a SLIMbus.

25. The system of claim 23 wherein the data bus manager is shared among the plurality of processing devices.

26. The system of claim 23 wherein the means for controlling comprises means for controlling the at least one component via the data base bus manager, associated with one of the plurality of processing devices, and a framer shared among the plurality of processing devices.

27. The system of claim 23 wherein the communication interfaces comprise at least one of High Speed Inter-Chip (HSIC), High-Speed Synchronous Serial Interface (HIS), Serial Peripheral Interface (SPI), universal asynchronous receiver/transmitter (UART), dual-ported random access memory (RAM) interface, or PCI (Peripheral Component Interconnect) Express (PCIe).

28. A device comprising:
at least one data bus connectable to a plurality of processing devices having data bus management capability, the at least one data bus being configured to establish an IPC layer for communication between the plurality of processing devices and the at least one data bus over a messaging layer utilized by the at least one data bus;
wherein the IPC layer is usable for controlling at least one component associated with the at least one data bus by at least one of the plurality of processing devices;
wherein the plurality of processing devices comprises a first processing device and a second processing device, the first processing device coupled to a first data bus manager for performing data bus administration for the at least one data bus; and
wherein the IPC layer is usable for passing control of the first data bus manager from the first processing device to the second processing device, by utilizing the IPC layer between the first processing device and the second processing device and without connecting the first data bus manager to the second processing device.

29. The device of claim 28 wherein the at least one data bus comprises a SLIMbus.

30. The device of claim 28 wherein the IPC layer utilizes a first messaging protocol that is different from a second messaging protocol associated with the messaging layer utilized by the at least one data bus.

31. The device of claim 28 wherein the IPC layer is usable for controlling the at least one component the data bus manager, associated with one of the plurality of processing devices, and a framer shared among the plurality of processing devices.

32. An apparatus comprising:
at least one processing device having data bus management capability; and
at least one data bus associated with the at least one processing device and connectable to a plurality of other processing devices having data bus management capability,
wherein communication interfaces between respective ones of the processing devices, established with the at least one data bus, enable control of at least one component associated with the at least one data bus by at least one of the processing devices;
wherein the plurality of processing devices comprises a first processing device and a second processing device, the first processing device coupled to a first data bus manager for performing data bus administration for the at least one data bus; and
wherein the communication interfaces are usable for passing control of the first data bus manager from the first processing device to the second processing device, by utilizing a communication interface between the first processing device and the second processing device and without connecting the first data bus manager to the second processing device.

33. The apparatus of claim 32 wherein the at least one data bus comprises a SLIMbus.

34. The apparatus of claim 32 wherein the communication interfaces comprise at least one of High Speed Inter-Chip (HSIC), High-Speed Synchronous Serial Interface (HIS), Serial Peripheral Interface (SPI), universal asynchronous receiver/transmitter (UART), dual-ported random access memory (RAM) interface, or PCI (Peripheral Component Interconnect) Express (PCIe).

35. At least one computer-readable medium having computer-executable instructions stored thereon that, when executed, cause at least one computing device to:
establish an IPC layer for communication between a plurality of processing devices having data bus management capability and at least one data bus over a messaging layer utilized by the at least one data bus,
wherein the IPC layer is usable for controlling at least one component associated with the at least one data bus by at least one of the plurality of processing devices;
wherein the plurality of processing devices comprises a first processing device and a second processing device, the first processing device coupled to a first data bus manager for performing data bus administration for the at least one data bus; and
wherein the IPC layer is usable for passing control of the first data bus manager from the first processing device to the second processing device, by utilizing the IPC layer between the first processing device and the second processing device and without connecting the first data bus manager to the second processing device.

36. The at least one computer-readable medium of claim 35 wherein the at least one data bus comprises a SLIMbus.

37. The at least one computer-readable medium of claim 35 wherein the IPC layer utilizes a first messaging protocol that is different from a second messaging protocol associated with the messaging layer utilized by the at least one data bus.

38. The at least one computer-readable medium of claim 35 wherein the IPC layer is usable for controlling the at least one component via the data bus manager, associated with one of the plurality of processing devices, and a framer shared among the plurality of processing devices.

39. At least one computer-readable medium having computer-executable instructions stored thereon that, when executed, cause at least one computing device to:
identify a plurality of processing devices having data bus management capability and at least one data bus associated with the plurality of processing devices;
establish communication interfaces between respective ones of the plurality of processing devices with the at least one data bus; and
control at least one component associated with the at least one data bus using at least one of the plurality of processing devices via the communication interfaces established between the respective ones of the plurality of processing devices;
wherein the plurality of processing devices comprises a first processing device and a second processing device, the first processing device coupled to a first data bus manager for performing data bus administration for the at least one data bus; and
wherein controlling the at least one component associated with the at least one data bus comprises passing control of the first data bus manager from the first processing device to the second processing device, by utilizing a communication interface between the first processing device and the second processing device and without connecting the first data bus manager to the second processing device.

40. The at least one computer-readable medium of claim 39 wherein the at least one data bus comprises a SLIMbus.

41. The at least one computer-readable medium of claim 39 wherein the communication interfaces comprise at least one of High Speed Inter-Chip (HSIC), High-Speed Synchronous Serial Interface (HIS), Serial Peripheral Interface (SPI), universal asynchronous receiver/transmitter (UART), dual-ported random access memory (RAM) interface, or PCI (Peripheral Component Interconnect) Express (PCIe).

\* \* \* \* \*